United States Patent [19]

Iwahashi et al.

[11] Patent Number: 4,775,951

[45] Date of Patent: Oct. 4, 1988

[54] CORRELATION FUNCTION COMPUTING DEVICE

[75] Inventors: Hiroyuki Iwahashi, Nara; Yoshiki Nishioka, Tenri, both of Japan

[73] Assignee: Computer Basic Technology Research Association, Tokyo, Japan

[21] Appl. No.: 935,095

[22] Filed: Nov. 24, 1986

Related U.S. Application Data

[63] Continuation of Ser. No. 561,520, Dec. 15, 1983, abandoned.

[30] Foreign Application Priority Data

Dec. 20, 1982 [JP] Japan .................. 57-224754

[51] Int. Cl.$^4$ .............. G06F 15/336; G10L 7/02; G10L 9/00
[52] U.S. Cl. .............. 364/728.03; 381/38; 381/49
[58] Field of Search ............ 364/728; 381/38, 49

[56] References Cited

U.S. PATENT DOCUMENTS

| | | | |
|---|---|---|---|
| 3,706,929 | 12/1972 | Robinson et al. | 381/49 |
| 3,819,920 | 6/1974 | Goldfischer | 364/728 |
| 4,063,082 | 12/1977 | Nussbaumer | 364/728 |
| 4,071,899 | 1/1978 | Holy | 364/728 |
| 4,282,405 | 8/1981 | Taguchi | 381/49 |

Primary Examiner—Gary V. Harkcom
Assistant Examiner—Dale M. Shaw
Attorney, Agent, or Firm—Birch, Stewart, Kolasch & Birch

[57] ABSTRACT

A correlation function computing device capable of computing a selfcorrelation function or the like is constructed to comprise a window function memorizing circuit, an A/D converting circuit for converting time series of a voice signal into digital values, a multiplier for calculating products of the window functions and the digitalized time series of the voice signal and also products required for the computation of the correlation function, a memory circuit for storing the products of the window functions and the digitalized time series of the voice signal delivered from the multiplier, a selector circuit for transferring data supplied to the multiplier, an adder for obtaining a product-sum in a divided manner, a memory circuit of a first-in and first-out type for storing the product-sum dividedly obtained in the adder, and a control circuit for controlling all of the aforementioned circuits.

4 Claims, 7 Drawing Sheets

CORRELATION FUNCTION COMPUTING DEVICE

This application is a continuation of application Ser. No. 561,520 filed on Dec. 15, 1983, and now abandoned.

BACKGROUND OF THE INVENTION

This invention relates to an improvement in a correlation function computing device which is adapted to compute a selfcorrelation function utilized as a characteristic parameter in voice recognition.

Assuming that $X(n)$ (n is an integer) represents a time series of a voice waveform and $W(n)$ represents a window function used for sectioning the waveform into short intervals, a selfcorrelation function $R(\tau)$ used as a characteristic parameter in voice recognition is ordinarily expressed as follows.

$$R(\tau) = \frac{1}{N} \sum_{n=1}^{N} W(n) \cdot X(n) \cdot W(n-\tau) \cdot X(n-\tau) \quad (1)$$

$$(\tau = 0, 1, \ldots, P)$$

wherein $\tau$ represents the order of the selfcorrelation function thus computed.

A heretofore known device for computing the selfcorrelation function to be used as a characteristic parameter in voice recognition has been so constructed that it includes a plurality of multipliers and adders, the multipliers calculating the product terms in the above equation (products of the window function and the digitalized voice signal), the adder calculating the sum of the thus calculated products, with the product-sum thus calculated stored in a memory device accompanying an address control circuit.

Such a conventional device for computing the selfcorrelation function has been found to be disadvantageous because it requires a number of costly multipliers and is inevitably complicated by the necessity of address control each time the product-sum is stored in or read out of the memory device.

SUMMARY OF THE INVENTION

An object of the present invention is to provide a correlation function computing device wherein the above described difficulties of the conventional device can be substantially eliminated.

Another object of the invention is to provide a correlation function computing device wherein the plurality of costly multipliers and the address control of the memory device are not required, and the selfcorrelation function can be obtained by a simple construction of the circuit.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

According to the present invention, a correlation function computing device is provided which comprises means for memorizing window functions, A/D converting means for converting time series of a voice signal into digital values, a multiplier for calculating products of the window functions and the digitalized time series of the voice signal and also products required for the computation of the correlation function, memory means for storing the products of the window functions and the digitalized time series of the voice signal delivered from the multiplier, selector means for transferring data supplied to the multiplier, an adder for obtaining product-sum in a divided manner, memory means of a first-in first-out type for storing the product-sum dividedly obtained in the adder, and control means for controlling all of the aforementioned means.

BRIEF DESCRIPTION OF THE DRAWINGS

The present invention will be better understood from the detailed description given hereinbelow and the accompanying drawings wherein.

DETAILED DESCRIPTION OF THE INVENTION

Figure 1:
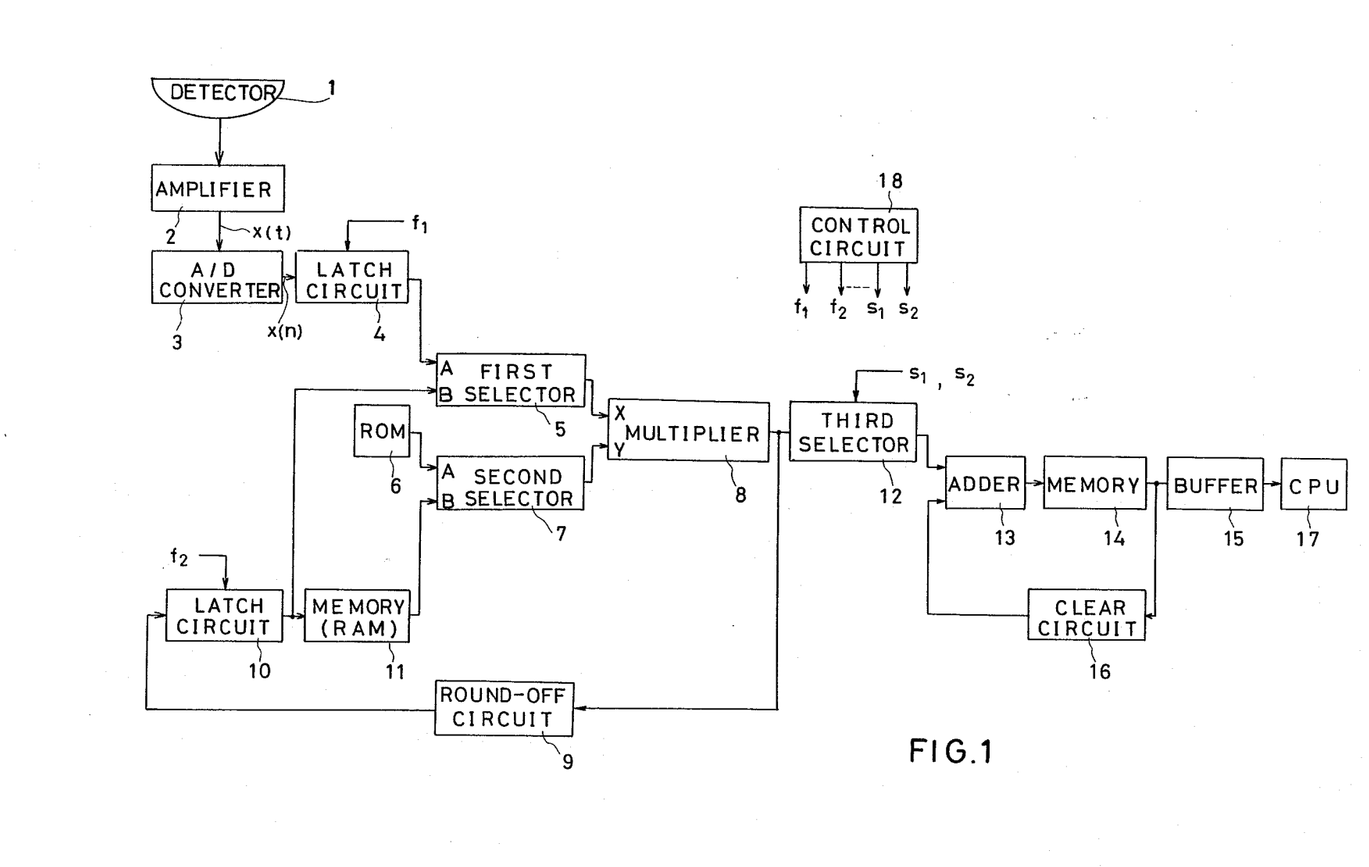
FIG. 1 is a block diagram showing a preferred embodiment of the present invention.

FIG. 1 is a block diagram showing a preferred embodiment of the present invention.

In this drawing, numeral 1 designates a detector such as a microphone for detecting voice and delivering an output to the input terminal of an A/D converter 3 through an amplifier 2. In the A/D converter 3 the input waveform is sampled in synchronism with a sampling signal S to be converted into digital signals with the output delivered into a latch circuit 4. The latch circuit 4 latches the input signal upon reception of a latching signal $f_1$ and delivers an output to an input terminal A of a first selector 5. ROM 6 memorizes window functions $W_1$ and $W_2$ (see FIG. 2). When the address is designated by a window function selecting bit signal WD and a window counter, ROM 6 delivers the window function stored therein to an input terminal A of a second selector 7.

The output terminals of the first and second selectors 5 and 7 are connected to input terminals X and Y of a multiplier 8, respectively, and it is determined whether the data applied to the input terminals are the digitally converted signal $X(n)$ and a window function or those required for the later described product-sum operation. The output of the multiplier 8 delivered through a round-off circuit 9 is latched into a latch circuit 10 under the control of a latching signal $f_2$. The output of the latch circuit is applied to an input terminal B of the first selector 5 and also to a memory device (RAM) 11.

The RAM 11 is address-controlled by two bits of the difference between the later described two-bit order counter and two-bit ring counter and also by three window function selecting bits. The output of the RAM 11 is applied to an input terminal B of the second selector 7. The output of the multiplier 8 is further applied to a third selector 12. Under the control of later described signals $S_1$ and $S_2$, the third selector 12 divides the input signal into four parts, and sequentially applies the four parts to an input terminal of an adder 13 starting with the lower part. The output terminal of the adder 13 is connected to the input terminal of a memory device 14 of a first-in first-out (FiFo) type. The output terminal of the memory device 14 is connected to the input terminal of a buffer 15 of also FiFo type, and is also connected through a clear circuit 16 to another input of the adder 13. The output terminal of the buffer 15 is connected to an input terminal of a CPU 17. Furthermore, a control circuit 18 is provided to include generators of various timing signals and control signals (such as the window function selecting bit signal, latch signal, and selector control signal).

Figure 2:
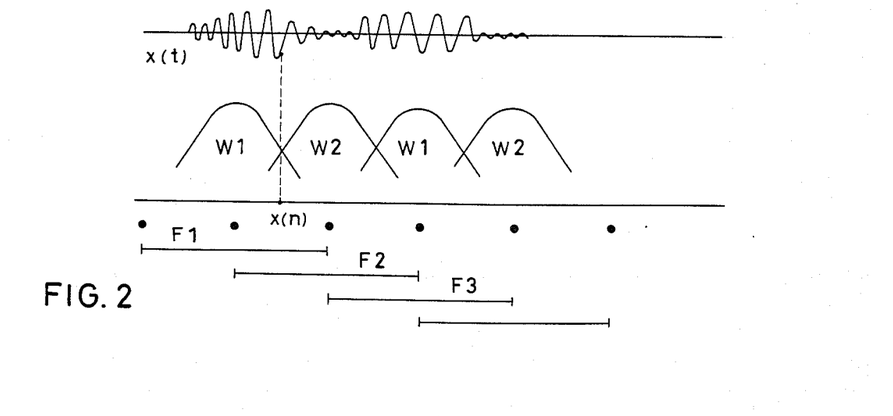
FIG. 2 is a diagram showing the relation between analyzing frames and analyzing periods.

The operation of the correlation function computing device will now be described. In the example shown in FIG. 1, the frame periods $F_1$ and $F_2$ are displaced in an overlapping relation as shown in FIG. 2, and it is so arranged that a selfcorrelation function of a sampling frequency 16 KHz, analyzing frame 16 ms, analyzing period 8 ms, and of an order up to third order can be obtained. In FIG. 2, x(t) represents a voice waveform, $W_1$ and $W_2$ represent window functions, and $F_1$ and $F_2$ designate analyzing frames.

In FIG. 1, the time series x(t) of the voice waveform is detected by the detector 1, amplified by the amplifier 2, and converted by the A/D converter 3 into a digital signal X(n) of 12 bits under control of a sampling signal S having a sampling frequency 16 KHz. Upon reception of the latching signal $f_1$, the latch circuit 4 latches the digital signal X(n) (see FIG. 3).

It is required that the product of the window function and the digital value X(n) thus latched in the latch circuit 4 is calculated. However, since the frame periods are overlapped as shown in FIG. 2, the digital value X(n) must be multiplied with $W_1(n)$ in the period of the frame $F_1$, and with $W_2(n)$ which is shifted one half period from the window function $W_1(n)$ in the period of the frame $F_2$. The values of the window functions $W_1$ and $W_2$ are fixedly memorized in 12 bits in ROM 6, and read out of the ROM 6 upon designation of addresses by nine bit signals made of one window function selecting bit WD obtained from a generator 181 and the output signal (8 bits) of a window counter 182. On the other hand, under the control of the selector control circuit 183, the first and second selectors 5 and 7 supply either the data related to the window function and X(n) or the data related to the product-sum to the multiplier 8. More specifically, when the digital value X(n) sampled in the A/D converter 3 is latched in the latch circuit 4 under the control of the latching signal $f_1$, the selectors 5 and 7 select the A the input terminal, and the window function selecting bit WD is held in the low level as shown in the time chart of FIG. 4, thus designating the window function $W_1$.

Figure 3:
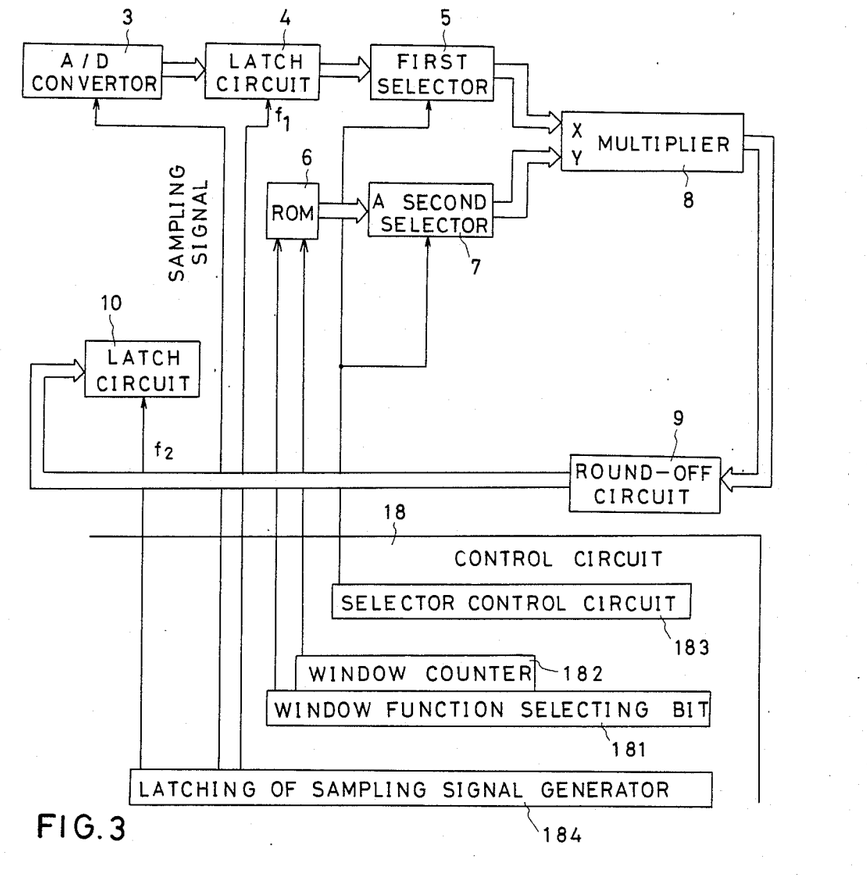
FIG. 3 is a diagram showing the flow of data (along a side A) to a multiplier.

Accordingly, a flow of data shown by broad arrow marks in FIG. 3 is realized, and the multiplier 8 produces a product of the window function $W_1(n)$ and the digital value X(n). The product expressed in 24 bits is rounded in the round-off circuit 9 into 12 bits, and the rounded result is latched into the latch circuit 10 under the control of a latching signal $f_2$ delivered from the latching signal generating circuit 184 (see FIG. 3). The product in the latch circuit 10 is then written in RAM 11 under the control of a write signal $\overline{WE}$ (see FIG. 4).

Figure 4:
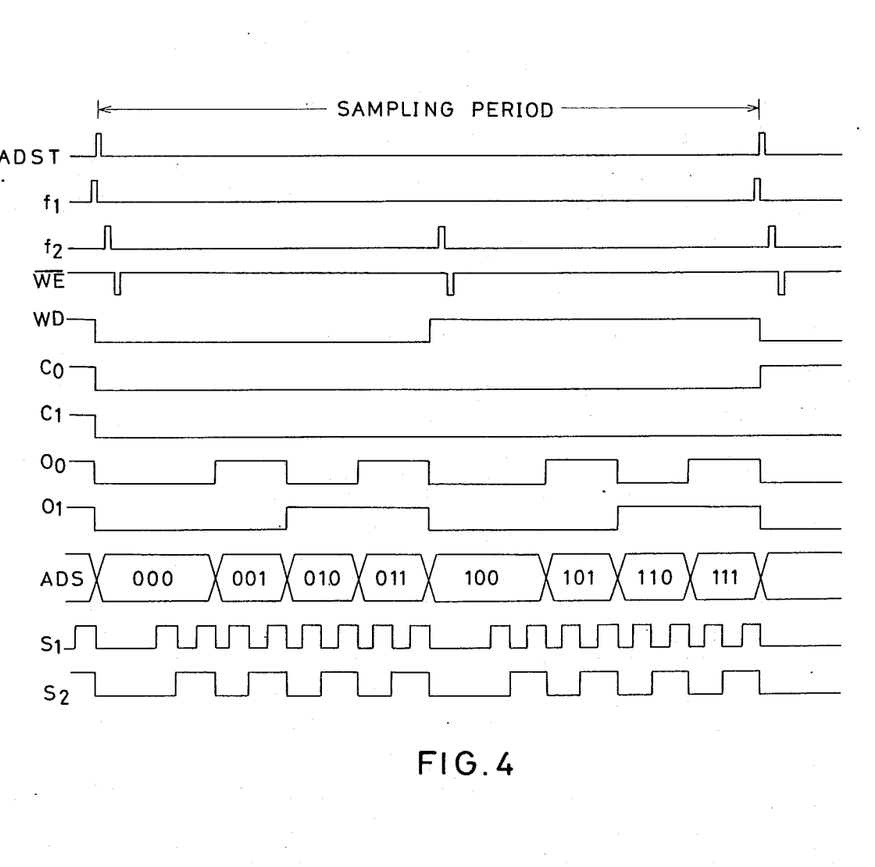
FIG. 4 is a time chart for one sampling period.
Figure 5:
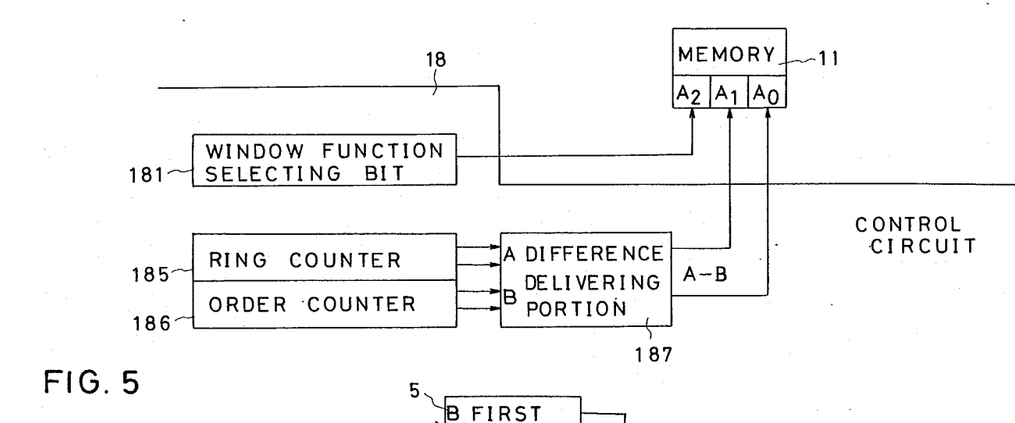
FIG. 5 is a block diagram showing the construction of an address controlling portion of a RAM.

As shown in FIG. 5, the address control of the RAM 11 is carried out by a 3 bit signal consisting of a 2 bit output signal $(A_1, A_o)$ of a difference delivering portion 187, which delivers the difference between the output $(O_1, O_o)$ of an order counter 186 in two bits and the output $(C_1, C_o)$ of a ring counter 185 in two bits (see FIG. 4), and one bit $(A_2)$ delivered from the window function selecting bit signal generator 181.

An example of addresses to be used for writing data in RAM 11 is as follows. The window function selecting bit $A_2=0$ because a window function $W_1$ is selected. It is assumed that the content of the ring counter 185 is (0 0), and since the order counter 186 is always set to (0 0) at the writing time of RAM 11, the output of the difference portion 187 becomes (0 0). Accordingly the address ADS is selected to be (000) (see FIG. 4), and the data $W_1(n)$.X(n) is written in the address (000) of the RAM 11 as shown in Table 1. As for the digital value $X(n-1)$ sampled immediately before the X(n), the product $W_1(n-1).X(n-1)$ has been written at address of (001) because the content of the ring counter 185 is (1 1). Likewise the products $W_1(n-2).X(n-2)$ and $W_1(n-3).X(n-3)$ have been written in the addresses (010) and (011), respectively.

TABLE 1

| Addresses | Memorized Contents |
|---|---|
| 0 0 0 | $W_1(n) \cdot X(n)$ |
| 0 0 1 | $W_1(n - 1) \cdot X(n - 1)$ |
| 0 1 0 | $W_1(n - 2) \cdot X(n - 2)$ |
| 0 1 1 | $W_1(n - 3) \cdot X(n - 3)$ |
| 1 0 0 | $W_2(n) \cdot X(n)$ |
| 1 0 1 | $W_2(n - 1) \cdot X(n - 1)$ |
| 1 1 0 | $W_2(n - 2) \cdot X(n - 2)$ |
| 1 1 1 | $W_2(n - 3) \cdot X(n - 3)$ |

Then the address (011) of the RAM 11 is rewritten by the product $W_1(n+1).X(n+1)$ as shown in Table 2. That is, the oldest data stored in RAM 11 is rewritten by the new data, so that the data required for carrying out the product-sum operation is always stored in the RAM 11.

TABLE 2

| Addresses | Memorized Contents |
|---|---|
| 0 0 0 | $W_1(n) \cdot X(n)$ |
| 0 0 1 | $W_1(n - 1) \cdot X(n - 1)$ |
| 0 1 0 | $W_1(n - 2) \cdot X(n - 2)$ |
| 0 1 1 | $W_1(n + 1) \cdot X(n + 1)$ |
| 1 0 0 | $W_2(n) \cdot X(n)$ |
| 1 0 1 | $W_2(n - 1) \cdot X(n - 1)$ |
| 1 1 0 | $W_2(n - 2) \cdot X(n - 2)$ |
| 1 1 1 | $W_2(n + 1) \cdot X(n + 1)$ |

After these products are stored in RAM 11, the operation of the first and second selectors 5 and 7 is transferred so as to select data applied to the input terminal B for carrying out the product-sum operation. Since the content of the order counter 186 is (0 0), the data having been stored at the address (000) of RAM 11, that is, $W_1(n).X(n)$ is applied through the second selector 7 to the input terminal Y of the multiplier 8. On the other hand, the data $W_1(n).X(n)$ having been latched in the latch circuit 10 is applied through the first selector 5 to the input terminal X of the multiplier 8, so that the product $(W_1(n).X(n))^2$ is calculated in the multiplier 8 (see FIG. 6).

Figure 7:
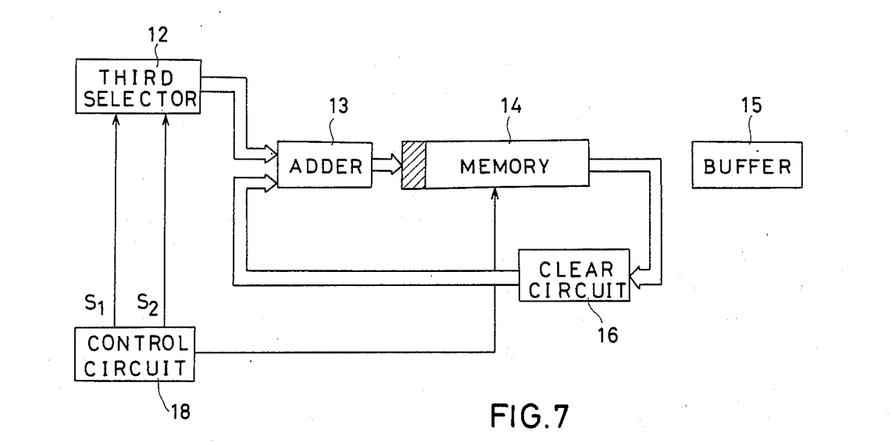
FIG. 7 is a diagram showing calculation of the sum of products utilizing memory means of a first-in first-out (FiFo) type.

The third selector 12 divides the product of 32 bits delivered from the multiplier 8 into four parts each having 8 bits under the control of the signals $S_1$ and $S_2$ (see FIG. 4). The adder 13 adds sequentially the four parts, starting from the lower part, to the product-sum that has been previously calculated and stored in the memory device 14 of the first-in first-out (FiFo) type, and returns the added result to be stored in the memory device 14. FIG. 7 illustrates the flow of data during the above described operation.

When the count of the order counter 186 becomes (01), and the data $W_1(n-1).X(n-1)$ stored at the address (001) in RAM 11 is applied to the input terminal Y of the multiplier 8, the multiplier 8 delivers an output $W_1(n-1).X(n-1).W_1(n).X(n)$ through the third selector 12 to the adder 13. In the adder 13, the output product is added to the product-sum read out of the FiFo type memory device 14, and the added result is returned to the memory device 14.

Figure 6:
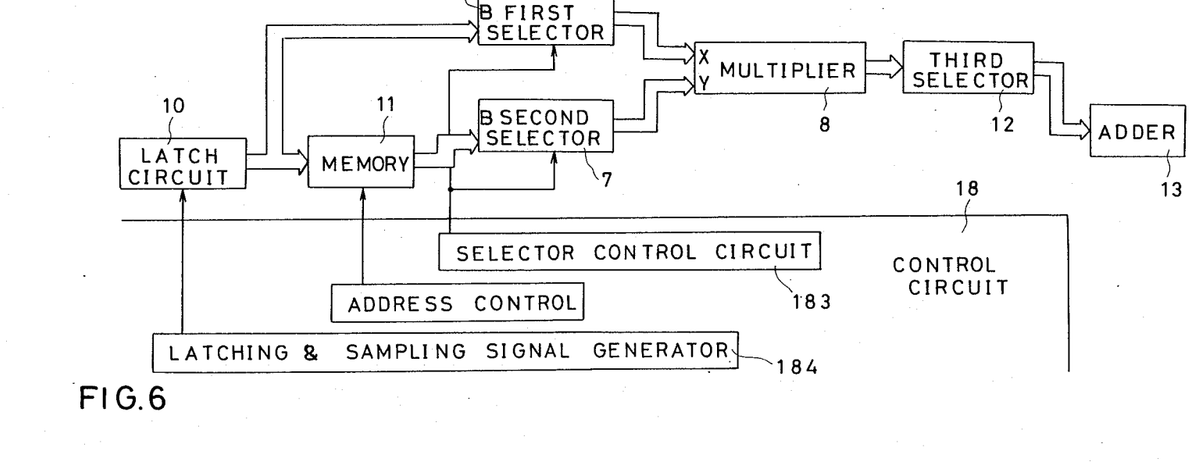
FIG. 6 is a diagram showing the flow of data (along a side B) to the multiplier.
Figure 8:
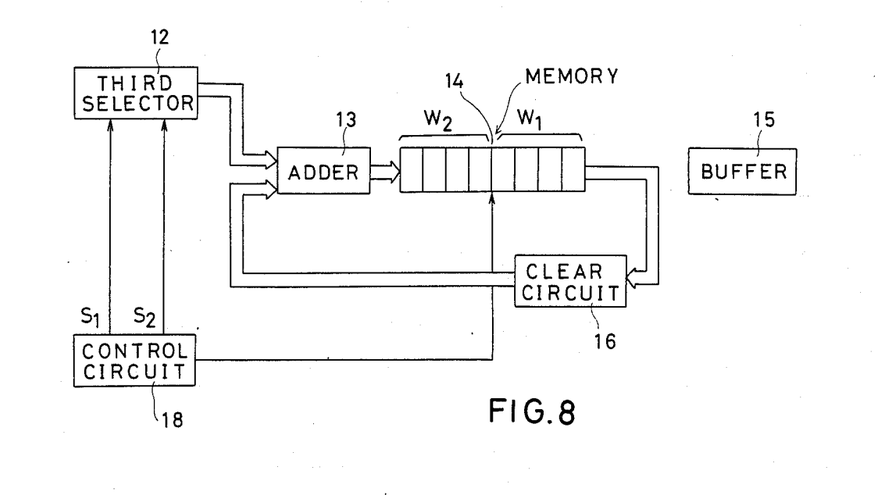
FIG. 8 is a diagram showing a condition of the FiFo type memory means after one sampling period.

Likewise according to the flow of data as shown in FIG. 6, when the count of the order counter 186 is varied to (1 0) and (1 1), product-sum operations for $W_1(n-2).X(n-2).W_1(n).X(n)$ and $W_1(n-3).X(n-3).W_1(n).X(n)$ are carried out, respectively. When computation for the window function $W_1$ terminates, the window function selecting bit WD is changed to 1, and the computation for the window function $W_2$ is carried out in the similar manner. As a consequence the product-sums for the window functions $W_1$ and $W_2$ are stored in the FiFo memory device 14 in succession (see FIG. 8). Since the window function selecting bit has been changed to 1, the products $W_2(n)$, $X(n)$, . . . , $W_2(n-3).X(n-3)$ have been written in the addresses (100), (101), (110) and (111) of RAM 11 as shown in Tables 1 and 2. The above described operation is carried out in one sampling period of the voice waveform. Such operation is repeated 256 times, and when the state shown in FIG. 8 is reached thereafter, the computation of $\Sigma W_1(n).X(n).W_1(n-\tau).X(n-\tau)$ with respect to the window function $W_1$ in an analyzing frame of 16 m S is completed. However, with respect to the window function $W_2$, only 128 operations have been executed, and hence the execution of 128 further operations is required.

Upon initiation of the subsequent sampling period, the clear circuit 16 is operated after attainment of the state shown in FIG. 8 so that the data returned to the adder 13 is brought into (0). More specifically, the product-sum $W_1(n). X(n). W_1(n-\tau). X(n-\tau)$ at the time of the operation of the clear circuit 16 is brought back to its initial value. On the other hand, the value of $\Sigma W_1(n).X(n).W_1(n-\tau).X(n-\tau)$ stored in the FiFo memory device 14 is shifted to the first-in first-out type buffer 15.

Figure 9:
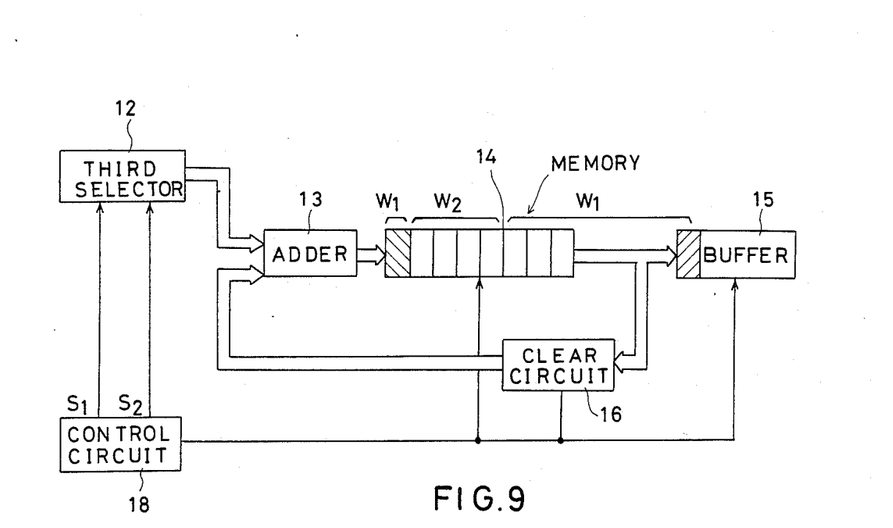
FIG. 9 is a diagram showing transfer operation of data to a FiFo type buffer.
Figure 10:
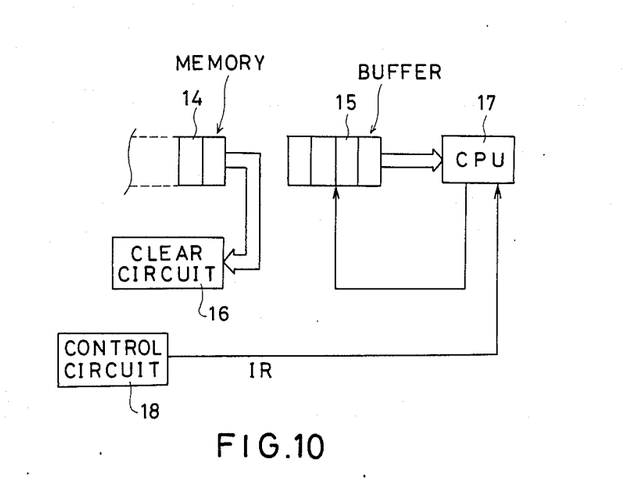
FIG. 10 is a diagram showing reception of a correlation function in CPU.

FIG. 9 illustrates the transfer of the product-sum data such as $\Sigma(W(n).X(n))^2$ to the buffer circuit 15 and the clear circuit 16. In the clear circuit 16, the data $\Sigma(W(n).X(n))^2$ is cleared, and the input from the third selector 12 is instead stored as an initial value in the memory device 14. When the FiFo buffer 15 becomes full, the control circuit 18 delivers an interruption signal IR to CPU 17 to cause it to receive the correlation function of 0 to 3rd order (see FIG. 10). By neglecting the lower eight bits in the function received in CPU 17, a correlation function as defined in Eq. (1) can be realized.

Figure 11:
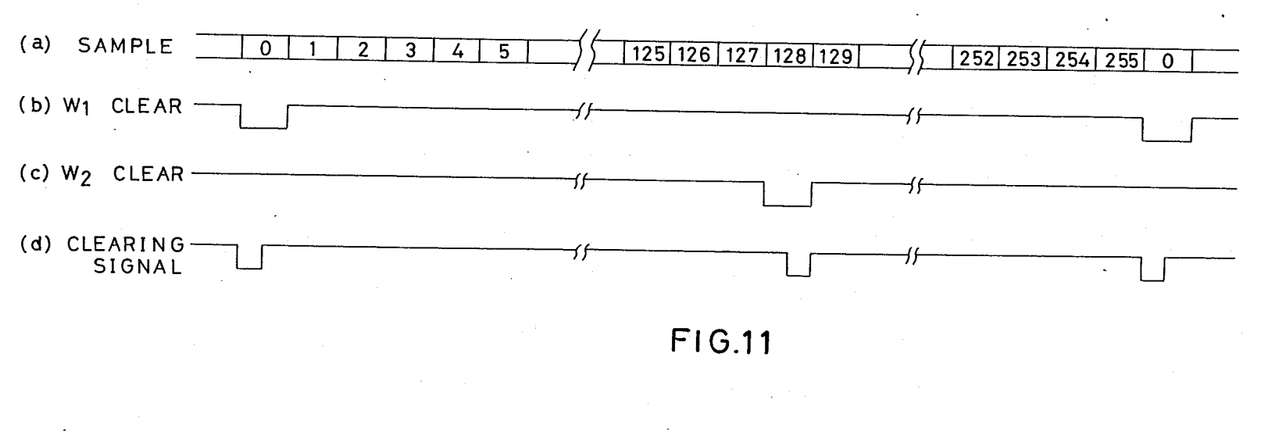
FIG. 11 is a time chart showing the operation of a clear circuit.

Since window functions $W_1$ and $W_2$ are shifted from each other by one-half sampling period, the value $\Sigma W_2(n).X(n).W_2(n-\tau).X(n-\tau)$ related to the window function $W_2$ can be obtained by carrying out similar operations in a sampling period delayed by 128 sampling times from that of the window function $W_1$. The value is stored in the FiFo memory device 14 in succession to the computed value for the window function $W_1$. As a consequence, by operating the clear circuit 16 in an aftward part of the sampling period, the value $\Sigma W_2(n).X(n).W_2(n-\tau).X(n-\tau)$ relating to the window function $W_2$ can be obtained in the FiFo buffer 15. FIG. 11 illustrates the timing of the above described operations.

Although the above described embodiment of the present invention is constructed to provide a correlation function up to the third order, it is apparent that the function of higher order may also be provided by suitably selecting the basic clock, RAM addresses, and the capacities of the RAM and the first-in first-out type memory device.

Since the first-in first-out type memory device is used for storing the product-sum obtained in accordance with the present invention, there is no necessity of address-controlling a memory device (RAM) as in the conventional devices, and therefore the construction of the device of the present invention can be substantially simplified.

Furthermore, since the product of the window function and the digitalized voice signal and also the product for computing the correlation function can be calculated in the same multiplier, the circuitry of the invention can be simplified remarkably.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A device for computing a correlation function comprising:
ROM means for storing window functions;
A/D converting means for converting a time series waveform of a voice signal into digital values;
a multiplier for calculating,
   (a) products of the window functions and the digitalized time series of the voice signal, and
   (b) products required for the computation of the correlation function;
memory means for storing the products of said window functions and said digitalized time series obtained from the multiplier;
latch means for storing said products of the window functions and the digitalized time series of the voice signal, and for providing said products of the window functions to said memory means;
first and second selector means for transferring data to the multiplier in a first mode from said A/D converting means and said ROM means respectively, and in a second mode to transfer data from said latch means and said memory means respectively;
adder means for obtaining a sum of said products required for the computation of the correlation function;

first-in first-out memory means for storing the sum obtained in the adder; and control means for synchronizing the operation of said ROM means, said A/D means, said first and second selector means, said memory means, and said latch means with each other, wherein the correlation function is represented as R ($\tau$), $\tau > 1$.

2. A device as claimed in claim 1, wherein said adder obtains said sum of said products by sequentially adding divided segments of said products obtained from the multiplier.

3. A device as claimed in claim 1, wherein the correlation function is used as a parameter in voice recognition.

4. A device for computing a correlation function used as a parameter in a voice recognition system comprising:

ROM means for storing window functions;

A/D converting means for converting a time series waveform of a voice signal into digital values;

a multiplier for calculating,
- (a) products of the window functions and the digitalized series of the voice signal, and
- (b) products required for the computation of the correlation function;

memory means for storing the products of said window functions and said digitalized time series obtained from the multiplier;

latch means for storing said products of the window functions and the digitalized time series of the voice signal, and for providing said products of the window functions to said memory means;

first and second selector means for transferring data to the multiplier in a first mode to transfer data from said A/D converting means and said ROM means respectively, and in a second mode to transfer data from said latch means and said memory means respectively;

adder means for obtaining a sum of said products required for the computation of the correlation function;

first-in first-out memory means for storing the sum obtained in the adder; and control means for synchronizing the operation of said ROM means, said A/D means, said first and second selector means, said memory means, and said latch means with each other, wherein the correlation function is represented as R ($\tau$), $\tau > 1$.

* * * * *